March 25, 1958 R. W. SCHUMANN 2,828,482

CONVERSION SYSTEMS

Filed May 15, 1956 2 Sheets-Sheet 1

| | $2^2$ | $2^1$ | $2^0$ |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |
| 9 | 0 | 0 | 0 |

INVENTOR
ROBERT W. SCHUMANN

BY Cushman, Darby & Cushman
ATTORNEYS

INVENTOR
ROBERT W. SCHUMANN

Cushman, Darby & Cushman
ATTORNEYS

United States Patent Office 2,828,482

Patented Mar. 25, 1958

2,828,482

CONVERSION SYSTEMS

Robert W. Schumann, Wheaton, Ill., assignor to Sperry Rand Corporation, New York, N. Y., a corporation of Delaware Application May 15, 1956, Serial No. 585,009

7 Claims. (Cl. 340—347)

This invention relates to analog-to-digital and digital-to-analog conversion systems and in particular to such systems utilizing magnetic core arrangements sometimes referred to as magnetic modulators.

In many automatic control applications, it is desirable to convert analog information from primary and secondary transducers into digital form. The electrical information produced, by several types of transducers is of the small signal variety. Thus several types of analog to digital converters presently require intermediate D. C. signal amplification when operating with this class of transducers. This, of course, introduces an additional source of data error into the system. Also the electrical output characteristics of different transducer types vary considerably. Thus if one converter is to handle several sources of data on a time sharing basis, it is very desirable in certain situations that a particular converter be capable of encoding information from sources having a wide range of output characteristics.

Many automatic control problems require equipments exhibiting a high degree of accuracy coupled with a short response time and good stability. Generally these requirements are diametrically opposed and a compromise solution is usually required in equipment design.

A primary object of this invention is to provide an analog-to-digital conversion system using magnetic core devices.

A further object of this invention is to provide an analog-to-digital converter capable of operating in numerous data channels wherein the electrical characteristics (which may vary considerably) of each channel is independent of all other channels and the analog data in any channel can be weighted by the converter.

A further object of this invention is to provide a means to convert from analog to digital signals without requiring intermediate D. C. amplification of small transducer or analog signals.

Another object of this invention is to provide an analog-to-digital converter with automatic zero and full-scale calibration.

A still further object is to provide a magnetic modulator type of analog-to-digital converter with exceptionally quick response.

Other objects and advantages of the invention will be apparent from the following specification and accompanying drawings, wherein.

Figures 1, 3, 4:
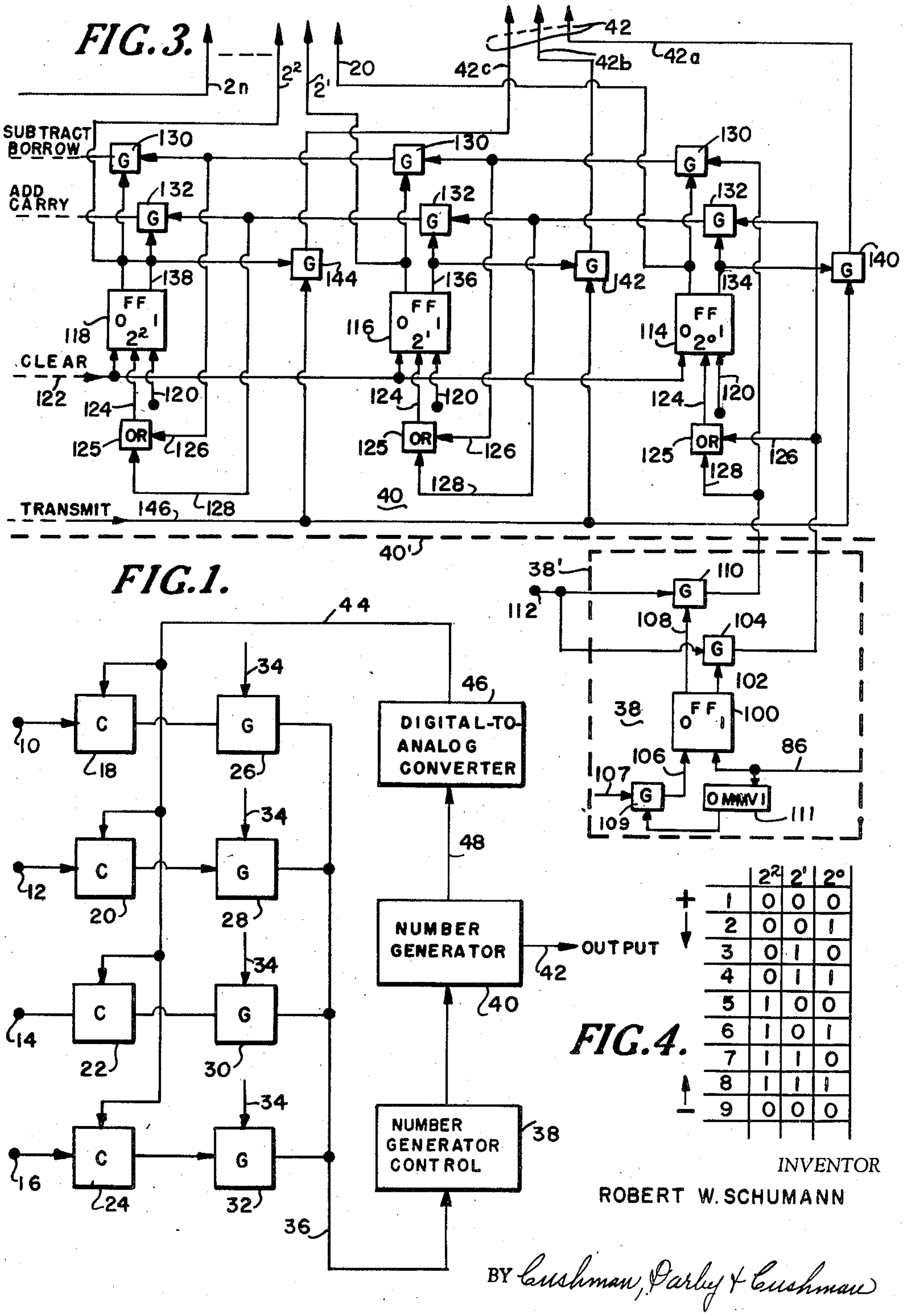
Figure 1 is a block diagram of a typical multichannel electronic analog-to-digital converter.
Figure 3 shows an exemplary number generator control and number generator circuit.
Figure 4 is a chart pertinent to the circuit of Figure 3.

Figure 1 illustrates an analog-to-digital converter which may be connected to any number of different data channels even though the electrical characteristics of the channels differ widely. For purposes of explaining this invention, only four data channels (not shown) are presumed, and the outputs thereof are applied respectively to terminals 10, 12, 14 and 16. The data channel outputs are D. C. or analog signals which are to be transformed into digital signals. This is accomplished by inserting the signals from the different data channels respectively into comparators 18, 20, 22 and 24. The output of each comparator is respectively applied to gating means such as gates 26, 28, 30 and 32. In order for the different data channels to be time-shared, the gates are sequentially enabled at their respective enabling inputs 34. When any one of the gates is enabled, the output from the corresponding comparator is applied over line 36 to number generator control 38. As will later be explained, the output of the number generator control 38 determines whether the number being generated in number generator 40 is to be increased or decreased in accordance with the amplitude of the signal on line 36. The output of number generator 40 on line 42 is a pulsating, digital signal corresponding in amplitude to the amplitude of the D. C. signal applied to the one of the comparators whose gate is enabled if the comparator is in balance. When the signal on line 44 is at such amplitude as to cause balance in the comparator, the digital manifestation on line 42 will be correct. However, if the signal on line 44 causes unbalance of a comparator the output of which is gated to line 36, number generator 40 compensates for such unbalance by increasing or decreasing its output a corresponding amount and applying the changed output to the digital-to-analog converter 46 over line 48. The signals emerging from number generator 40 on line 48 are such that they may be summed by the converter 46 to provide a D. C. or analog signal on line 44 which is representative of the digital signal on line 48 causing such analog signal.

Figure 2:
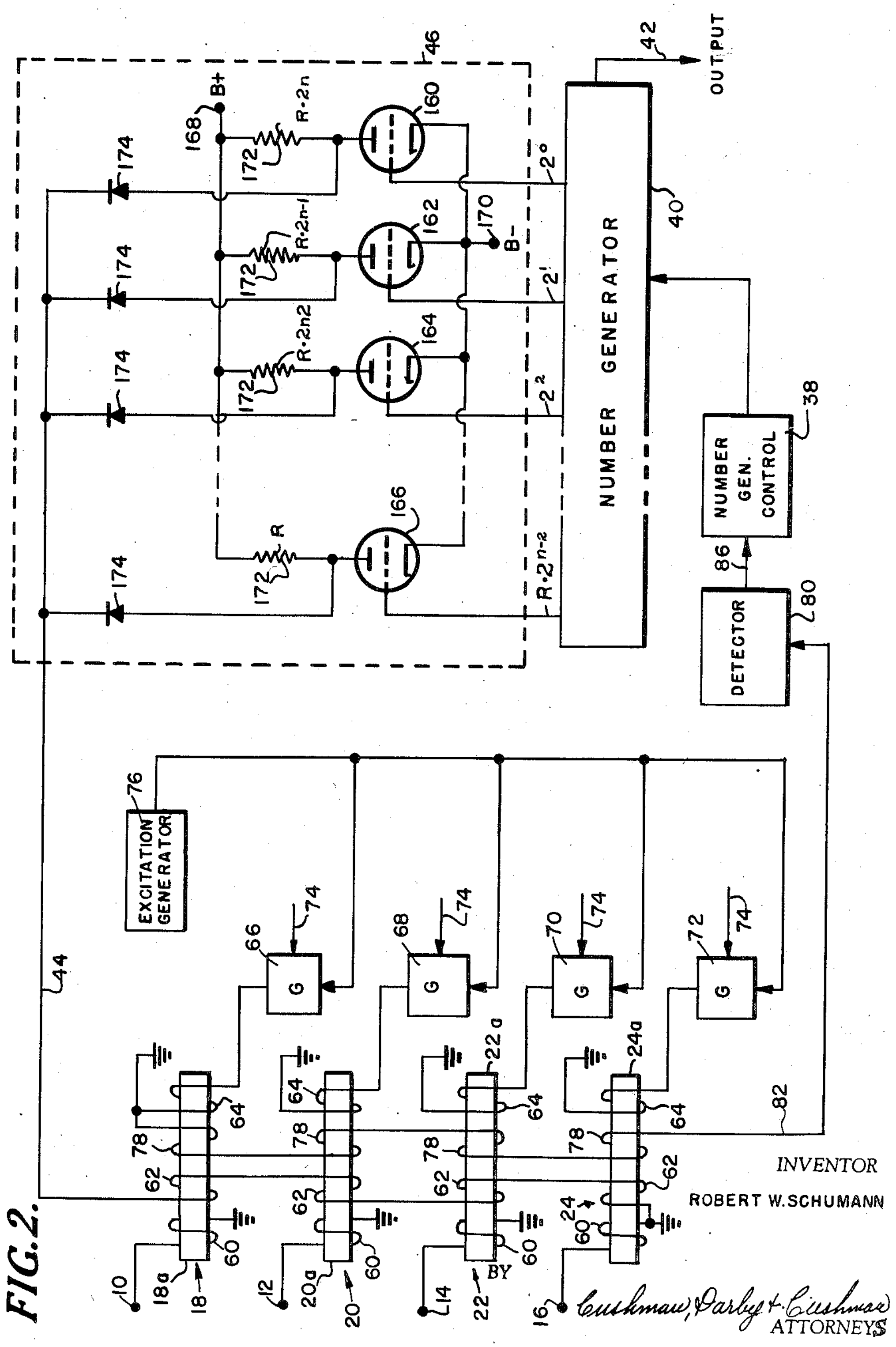
Figure 2 illustrates the invention as applied to Figure 1.

To illustrate a more specific embodiment of the invention, reference is now made to Figure 2. The comparators 18, 20, 22 and 24 may take the form of magnetic modulators having magnetic cores 18*a*, 20*a*, 22*a* and 24*a* respectively. The input terminals 10, 12, 14 and 26 each lead to a respective D. C. signal biasing winding 60, the other end of which is grounded. In addition each of the cores carries a comparative or second input winding 62 wound on each core in opposition to winding 60 and connected in series with each other to ground. The cores are alternately saturated in opposite directions by application of alternating current to winding 64 when the respective gates 66, 68, 70 and 72 are enabled by channel selection signals on one of the enabling input lines 74. The source of alternating current which effectively passes the gates is an alternating current excitation generator 76 which may be of known type. The gates may be, for example, pentodes which are designed to operate on the linear portion of their characteristic curve when enabled by a signal to a thin suppressor grid from line 74.

When a modulator is excited, an output signal is induced in the respective output winding 78 for the modulator. The output windings 78 are connected in series to ground and at their other end via line 82 to detector 80. Output from any one of the modulators, as it appears on line 82, will be an alternating output. If the current on line 44 is of such magnitude as to cause a magnetomotive force on any one of the modulator cores equal but opposite to the magnetomotive force caused by the D. C. input to biasing winding 60 on the same core, when said core is excited, the alternating output on line 82 will be symmetrical. That is, the positive and negative amplitudes of the signal on line 82 will be equal. However, if the magnetomotive forces produced by windings 60 and 62 on a core are different so that the core is effectively magnetically biased, the output signal on line 82 will be asymmetric. Detector 80 will detect any asymmetry in the output from any one of the cores and will provide a signal on line 86 corresponding in amplitude from a predetermined or threshold level, to the direction and amount of the net magnetic bias on the excited modulator. That is, the deviation from said predetermined level in one direction or the other is relative to the polarity of the net magnetic bias, while the amount of deviation corresponds to the amplitude of the net magnetic bias. A detector of this type is illustrated and described in my copending application filed May 15, 1956, Serial No. 585,008.

Number generator 40 has a plurality of outputs indicated respectively $2^0$, $2^1$, $2^2$ . . . $2^n$ and may be a so-called forward-backward counter. When the magnetomotive forces produced by the current through windings 60 and 62 are different, the output of number generator control 38 will cause the number generator 40 to change its contents in a direction so as to approach an equality of magnetomotive forces in windings 60 and 62 on the modulator being excited. If the net magnetic bias produced by the currents in windings 60 and 62 of an excited modulator is positive, the number generator 40 may generate a more positive number, for example. Conversely, then, when the net magnetic bias is negative, it generates a more negative number to cause the magnetic bias to return to zero. The different output lines of the number generator carry either a continuous signal or no signal, indicating a "1" or a "0" of a digital system, respectively.

A specific embodiment of the number generator control 38 and number generator 40 will now be described to clarify the forthcoming explanation of the operation of the digital converter 46.

Referring to Figure 3, the apparatus illustrated within dash line 38′ is the number generator control 38, while the apparatus above dash line 40′ is the number generator 40. The output on line 86 of Figure 2 from the detector 80 is applied to the "1" input side of a flip-flop 100. This flip-flop is preferably of the bi-stable type operative only when a signal of threshold amplitude is applied to one of its inputs. Therefore, when the output from detector 80 exceeds in amplitude said threshold level, flip-flop 100 is "set" to provide an enabling output on line 102 to gate 104. However, if the output from detector 80 of Figure 2 does not exceed the threshold level, flip-flop 100 will be set to its "0" position by a resetting impulse applied to line 106. A reset pulse reaches line 106 from line 107 via gate 109 when the gate is enabled by an output from the "0" side of monostable multivibrator 111. A signal of threshold amplitude or greater on line 86 temporarily triggers the multivibrator 111 to its "1" state in which it stays just long enough to prevent the immediately following reset pulse on line 107 from setting flip-flop 100 back to "0." However, if the next pulse on line 86 is of less than threshold amplitude, multivibrator 111 will enable gate 109 and allow the following reset pulse to set flip-flop 100 to "0." Therefore, it is apparent that the reset pulses on line 107 should occur with the same frequency as the output on line 86, but approximately 180° out of phase therewith.

An output resulting from an impulse on line 106 provides an output on line 108 to enable gate 110. Periodic timing impulses are applied to terminal 112 and effectively pass gates 104 and 110 when the gates are enabled. The significance of a timing impulse through gate 104 is such that the digital binary number from generator 40 is caused to increase by 1, while a timing pulse through gate 110 accomplishes a subtraction of 1 from the digital number in the generator 40. The frequency of the timing pulses as compared to the frequency of the reset pulses or the output on line 86 varies inversely with the accuracy resulting, i. e., the more timing pulses presented to terminal 112 while flip-flop 100 is in either of its states, the greater will be the number change and vice versa. With only one timing pulse per cycle of reset pulses, the generated number will change only by 1. Under any frequency of timing pulses, the generated number will actually oscillate around the true digital value.

The number generator 40 is composed of a flip-flop 114 for its $2^0$ stage, flip-flop 116 for the $2^1$ stage, flip-flop 118 for the $2^2$ stage, etc., for whatever remaining stages are in the generator. Each of these flip-flops is of the toggle type which may be set to its "1" state by an input on lines 120 or to its "0" state by input on clearing line 122, while an input on line 124 will toggle the state of the flip-flop from "1" to "0" or vice versa. Connected to lines 124 respectively are "or" circuits 125, each of which have two input lines 126 and 128, a signal on either of which will provide an output on line 124 to toggle the respective flip-flops. Each of the flip-flops 114, 116 and 118 has a gate 130 connected to its "0" output line and a gate 132 connected respectively by lines 134, 136, 138 to the "1" output sides of the flip-flops. The "0" output lines of flip-flops 114, 116 and 118 are connected respectively to the $2^0$, $2^1$, $2^2$ output lines which are also illustrated in Figure 2. For providing a digital output, lines 134, 136 and 138 connect respectively as enabling inputs to gates 140, 142, and 144 which, when enabled, transmit a digital pulse from the common input line 146 to the output lines 42*a*, 42*b* and 42*c*, respectively. These output lines together with like lines, if any (not shown) comprise output line 42 of Figures 1 and 2.

In operation, number generator 40 of Figure 3 proceeds to follow the binary number table set out in Figure 4. For the three digital stages illustrated in Figure 3, there are eight possibilities of digital combinations at their output lines. Of course, for more stages there would be more output combinations, and in fact, there would be $2^n$ output combinations where $n$ represents the number of stages. In the chart shown in Figure 4, each column represents a stage with the one on the right being headed $2^0$ while the columns successively to the left are headed $2^1$ and $2^2$, respectively. The number generator may be initially set to represent any desired number by proper signals on lines 120, but to show the operation thereof it will be assumed that a pulse has been received on the clearing line 122 to set all the flip-flops to "0." From thence timing signals through gate 104 of the generator control 38 will successively set the flip-flops to the binary values indicated in each line 1 through 9 in the chart of Figure 4. Similarly, a timing impulse issuing from gate 110 of the generator control 38 will cause a subtraction and the number generator upon successive receipt of such pulses follows the binary numbers as illustrated in Figure 4 from the bottom of the chart upwards line by line. Therefore, the generator 40 will increase or decrease its binary number in accordance with whether a pulse is received on lines 86 or 106 to the flip-flop 100 in the generator control 38. Another embodiment of a forward-backward counter which may be utilized with this invention is discussed beginning at page 42 of the "Proceeding of the ACM" of May 2 and 3, 1952.

With the operation of the number generator control in mind, it will be apparent that the outputs on lines $2^0$, $2^1$, $2^2$, etc. in Figure 2 represent 1's or 0's depending upon the presence or absence of a signal, respectively, on each line. The grids of the respective vacuum tubes 160, 162, 164, and 166 are connected respectively to the $2^0$, $2^1$, $2^2$ and $2^n$ output lines and the "0" or "1" level of voltage thereon will determine whether or not the respective vacuum tubes will conduct a space discharge current. The vacuum tubes are connected in parallel to a source of voltage B at terminals 168 and 170, the former being B+ and the latter B−. The current from terminal 168 flows through a plate resistor 172 to the vacuum tube which is made conductive. However, the amount of current for each vacuum tube is different and is regulated by the size of the plate resistors 172. For the resistor 172 connected to tube 166 whose grid is connected to line $2^n$, the value of resistor 172 is regulated to be R ohms. The plate resistors for the tubes connected increasingly to the number generator outputs corresponds inversely in value to the power of two times R ohms. That is, resistor 172 for tube 160 has a value R times $2^n$, the plate resistor for tube 162 has a value of R times $2^{n-1}$, the plate resistor for tube 164 has a value of R times $2^{n-2}$, etc., to R for the plate resistor for tube 166 in the $n$th stage of the number generator output. Connected between the plate resistor and the plate electrode of each vacuum tube is the anode of a diode 174. The cathodes of these diodes are connected in common to line 44.

The converter 46 as thus described is a current summation device. Since the plate load resistances vary as the power of two, the currents drawn through the resistors, respectively, vary also as a power of two when the vacuum tubes are non-conductive. When any vacuum tube is conducting, its associated diode 174 is cut off so that no current is provided therethrough from the associated precision resistor 172 to line 44. The digit positions in the number generator 40 which contain a "1" cause the associated vacuum tube to be non-conductive. Thus, diodes 174 form a current summing circuit which produces a direct current corresponding to the digital number in the number generator 40. It is apparent, then, that digital converter 46 sums the "1's" in the number generator since the "0" outputs therefrom prevent current through the corresponding diode 174.

Because the physical quantities being compared are actually the magnetomotive forces produced by the currents in the input winding and the reference current winding, it is entirely practical to choose, for any single modulator, the value of signal input current which is to represent full scale. If the reference current is equal to I amperes at full scale, and if there are N turns at full scale, then it is possible to choose any reasonable value of full scale signal current by making the number of turns on the input winding such that the product of full scale signal current times the number of turns on the input winding are equal to IN. Thus, one modulator of the multi-channel data converter might employ 100 turns on the input winding and 10 turns on the reference current winding, whereas the reverse might be true for another modulator. Then the value of signal current which represents full scale for one channel might be, for example, 1 milliampere, but for the other channel it would be 100 milliamperes.

Since the input signals might be in the form of voltages, such as is the case where the measuring transducer is a thermocouple, it might be necessary to insure exceedingly high stability of the resistance of the input winding. In such a case, a winding might be made using a wire such as manganin, or platinum, which have predictable and small variations of resistance with temperature, or predictable contact potentials will exist at the input terminals.

Thus it is apparent that there is provided by this invention a system in which the various objects and advantages herein set forth, among others, are successfully achieved. Modifications of this invention not described herein will become apparent to those skilled in the art. Therefore, it is intended that the matter contained in the foregoing description and the accompanying drawings be interpreted as illustrative and not limitative, the scope of the invention being defined in the appended claims.

What is claimed is:

1. An analog-to-digital data conversion system comprising, at least one magnetic core, a first winding on the core for carrying an input analog current to be measured, excitation means for alternately driving the core to opposing states of flux density, detector means coupled to the core to respond to excitation thereof for detecting asymmetry of output from the core, means coupled to the detector means for generating a digital number, means coupled to the digital number generating means for generating a corresponding analog current, and second winding means on the core for carrying said generated analog current, the magnetizing forces applied to the core due to said respective currents being in opposition, the arrangement being such that differences in the magnetizing forces applied by the currents will cause shift in the digital number generating means toward re-establishment of balance in the magnetizing forces.

2. A system as in claim 1 wherein the means for generating a digital number is a backward-forward mounting means having a plurality of digital outputs representative of the digital number, said counting means being responsive to the output of the detector means to add to or subtract from the generated digital number an amount corresponding to the direction and amount of unbalance of the magnetizing forces present in the core.

3. A system as in claim 1 wherein: said means coupled to the digital number generating means for generating said corresponding analog current includes current summation means for summing said plurality of digital outputs making up said digital number on a like plurality of digital output cores.

4. Apparatus as in claim 3 wherein the current summation means includes a plurality of grid controlled tubes each one connected at its grid to a different one of said digital output lines, a plate resistance for each of said tubes, said tubes being connected in common through the respective plate resistances to a source of voltage, each of the resistances differing from another resistance in value by a power of two, a plurality of unidirectional current conducting devices connected respectively to the plates of said vacuum tubes and in common to form an output line of said converter, the arrangement being such that the current on said output line corresponds to the digital number generated in said digital number generating means.

5. A system as in claim 1 including one or more additional magnetic cores each having a first winding thereon for carrying an input analog current to be measured which may be different from the currents presented to the other cores, means for operatively coupling the detector means to all of the cores to cause response of the detector means to the respective cores in predetermined time-sharing sequence, each of the additional cores having a second winding thereon to carry the analog current output from said analog current generating means at least during response of the detector means to a given core, the arrangement being such that a plurality of cores may be utilized without duplication of the remaining recited component.

6. A system as in claim 5 wherein: the magnetic coupling of the respective windings to the respective cores are selected so that input analog currents within different expected ranges for each core will nevertheless apply corresponding magnetizing forces to the respective cores to match the magnetizing forces applied by the system generated analog current.

7. A system as in claim 5 wherein the number of turns of the respective windings on the respective cores is selected so that input analog currents within different expected ranges for each core will nevertheless apply corresponding magnetizing forces to the respective cores to match the magnetizing forces applied by the system generated analog current.

No references cited.

UNITED STATES PATENT OFFICE

CERTIFICATE OF CORRECTION

Patent No. 2,828,482 March 25, 1958

Robert W. Schumann

It is hereby certified that error appears in the above numbered patent requiring correction and that the said Letters Patent should read as corrected below.

In the drawings, Sheet 1, in Figure 3, the numeral "20" in the upper left-hand corner should be -- $2^0$ -- and the line interconnecting the junction between output line 138 and gate 132 to the like junction between flip-flop 118 and gate 130 should be deleted; column 6, line 16, for "mounting" read -- counting --.

Signed and sealed this 12th day of August 1958.

(SEAL)
Attest:

KARL H. AXLINE
Attesting Officer

ROBERT C. WATSON
Commissioner of Patents